H. ROWNTREE.
ELECTRIC CONTROL OF FLUID PRESSURE ACTUATED MOTORS.
APPLICATION FILED DEC. 30, 1916.
1,300,781.
Patented Apr. 15, 1919.
2 SHEETS—SHEET 2.
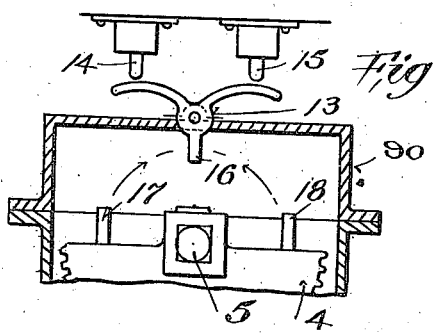
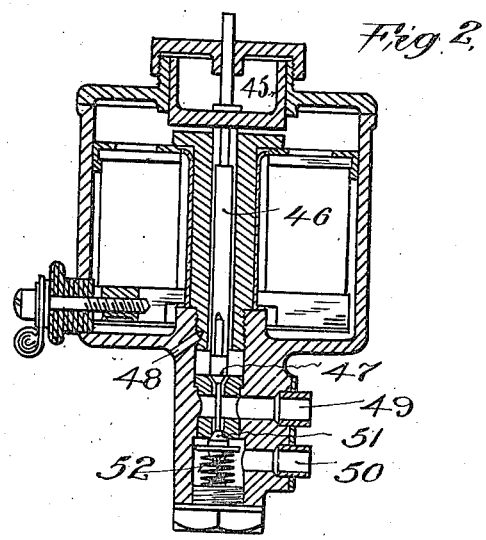
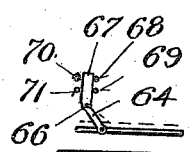
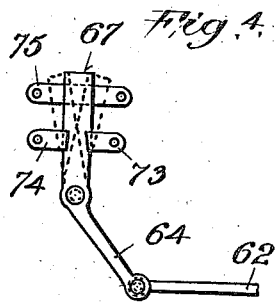
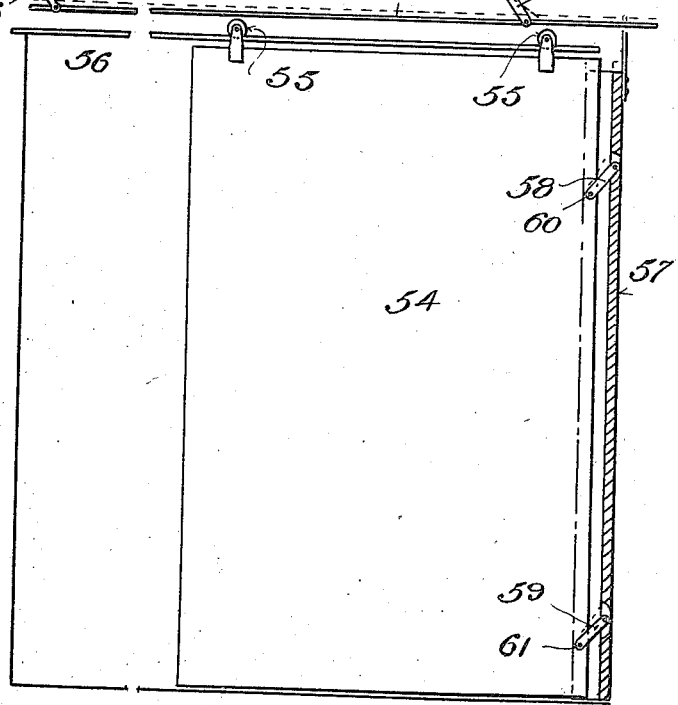
Inventor
Harold Rowntree
By his Attorney
Samuel E. Darby

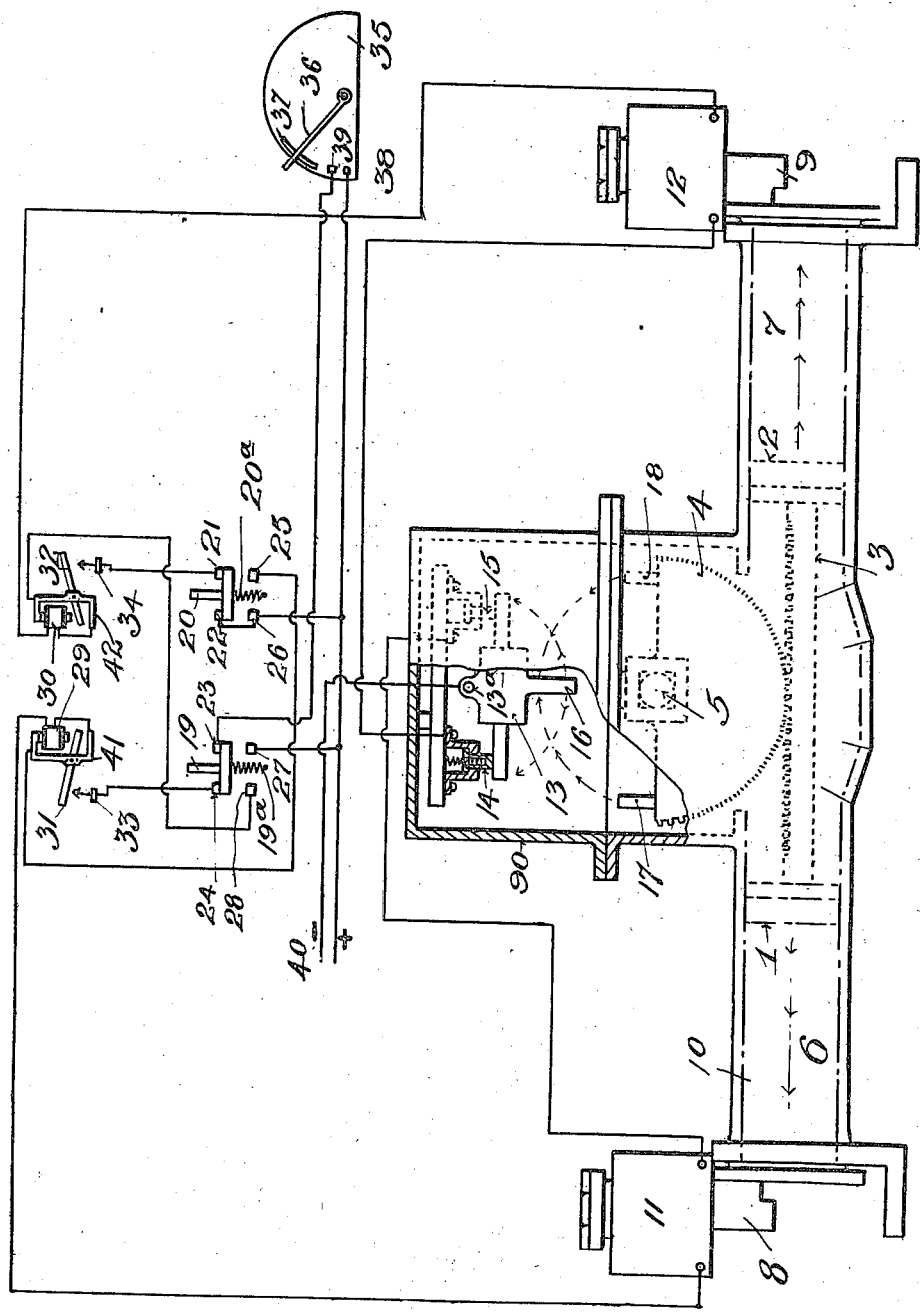

UNITED STATES PATENT OFFICE.

HAROLD ROWNTREE, OF KENILWORTH, ILLINOIS, ASSIGNOR TO NATIONAL PNEUMATIC COMPANY, OF CHICAGO, ILLINOIS, A CORPORATION OF WEST VIRGINIA.

ELECTRIC CONTROL OF FLUID-PRESSURE-ACTUATED MOTORS.

1,300,781.    Specification of Letters Patent.    Patented Apr. 15, 1919.

Application filed December 30, 1916. Serial No. 139,794.

*To all whom it may concern:*

Be it known that I, HAROLD ROWNTREE, a citizen of the United States, residing at Kenilworth, county of Cook, State of Illinois, have made a certain new and useful Invention in Electric Control of Fluid-Pressure-Actuated Motors, of which the following is a specification.

This invention relates to electric systems and arrangements for controlling the operation of fluid pressure actuated motor, for examples, motors of that type used in opening doors, gates or the like.

The object of the invention is to provide electrically controlled valves for controlling the admission and exhaust of fluid pressure to the motor without the use of an intermediate controlling valve.

A further object of the invention is to provide means for maintaining the electric valve energized until the working stroke of the motor is completed with but a momentary initial completion of the circuit controlling the electric valve.

A further object of the invention is to provide an electrically controlled fluid pressure actuated door operating system which is simple in structure and arrangement, efficient in operation and economical of manufacture.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawings,—

Figure 1 is a view in elevation of a fluid pressure actuated motor, partly broken away, employed in acordance with my invention, and showing a circuit arangement of electrical control of the same.

Fig. 2 is a sectional view of a magnet valve employed in accordance with my invention.

Fig. 3 is a modified structure of switch embodying my invention.

Fig. 4 is another modification of switch.

Fig. 5 is a view in elevation of a door with a collapsible shoe and switch control employed in accordance with my invention. The same part is designated by the same reference numeral wherever it occurs throughout the several views.

In the art of fluid pressure actuated motors, and particularly in the art where such motors are employed for operating doors, gates or the like, to open and close the same, it is old to have a main valve for controlling the supply and exhaust of fluid pressure to and from the cylinder wherein the main valve is itself operated by fluid pressure in a small auxiliary cylinder which in turn is controlled by the admission and exhaust of fluid pressure through electrical or magnet valves, so that the momentary energization of one or the other of the electric or magnet valves would shift the main valve into its desired position for opening the main cylinder to supply or exhaust. In such systems, the deënergization of the magnet would not affect the position of the main valve, and, therefore, the engine would complete its motion just as though the magnet or electric valve had remained energized.

When, however, it is desirable to eliminate the intermediate or main valve and to control the admission and exhaust of fluid pressure to the main cylinder directly from the electrically controlled valves, it is necessary to provide means for maintaining the electrically controlled valves in their energized position until the engine has completed its stroke, and means for automatically deënergizing the valves when the engine has completed its stroke. It is also desirable that if, during the motion of the door engine toward one extreme or the other, it is desired to instantly reverse the door, that this reversal can be accomplished by the momentary energization of the other electrically controlled valve, thereby not only deënergizing the first valve, but also maintaining the second or reverse valve in its energized position until the door engine has completed its reversed movement.

It is known in the art that the automatic energization of the electrically controlled valve can be obtained by the use of electric contacts or brushes operated continuously in connection with the movement of the door and so arranged that when the door is moving in one direction only one of the electrically controlled valves is energized, and when moving in the other direction, only the other of the valves is energized. This arrangement is subject to the objection that while the door can be stopped, it cannot be reversed during its motion. It is also known in the art that the energization of the electrically controlled valves can be obtained by the use of an auxiliary piston operated by the fluid pressure that is admitted to one end or the other of the cylinder of the engine, and which closes a switch which thereby closes a circuit and completes and maintains the energization of the valve until the engine has completed its movement whereupon the auxiliary cylinder is exhausted, and the switch therefore opened, and the circuit broken. While this is an efficient arrangement, the cost of manufacture, installation and maintenance of the auxiliary circuit closing cylinders makes the same more expensive than the old system of employing the main valve hereinbefore described.

It is among the special purposes of my present invention, therefore, to provide a simple, cheap and efficient system wherein the intermediate valve is eliminated, the electrically controlled valves are maintained energized with but a momentary initial energization, and the reversal of the movement of the engine can be secured at any instant. I will now describe, with reference to the drawings forming a part thereof, how I secure the results sought as above outlined, without direct or indirect operation by the fluid pressure admitted to the cylinder of the engine, and without any auxiliary fluid pressure control.

Referring to Fig. 1, reference numeral 10 designates the door engine which is provided with pistons 1 and 2 connected by rack 3 operating in a gear 4 working on shaft 5. Piston 1 operates in cylinder 6, and piston 2 in cylinder 7. The supply and exhaust of fluid pressure to cylinder 6 is controlled by valve 8, and to cylinder 7, by valve 9. The valves 8 and 9 are controlled, respectively, by magnets 11 and 12. The specific valves and magnet control shown, are designated in the art magnet valves, and the specific construction of the same will be more fully hereinafter set forth in connection with Fig. 2 of the drawing. It is sufficient at this point to state with respect thereto that the action of the magnet valves is such that when either magnet is energized, fluid pressure is admitted to its cylinder, and when the magnet is deënergized, fluid pressure is shut off and the cylinder is opened to exhaust.
Above the gear 4 and the shaft 5, I place a switch 13 which swings about a pivot 13ª, and which normally as shown, makes connection between contacts 14 and 15 and switch 13 which connects to the return 40.
These contacts are held by springs against the two arms of the pivoted switch 13, as shown. The switch 13 has a lower extending arm 16 against which two lugs 17 and 18 on gear 4 make contact, one or the other of said lugs 17 or 18 making contact with arm 16 just as the door completes its motion in one direction or the other, thereby opening and disconnecting switch 13 either at contact 14 or contact 15, as will be readily understood, one of said contacts becoming open circuited, and the other contact being slightly depressed against its actuating spring. It will be readily seen that as soon as the engine begins its motion from either of its extreme positions, the lug 17 or 18 as the case may be, moves away from the arm 16 of switch 13, and thereby allowing the switch to assume its normal position, connecting and completing the circuit between contacts 14 and 15 and return 40 as shown.

At any suitable location, I provide switches, preferably push button switches illustrated at 19 and 20. These push button switches are held normally in one extreme position in any suitable manner, for example by springs 19ª and 20ª. When so held, switch 20 completes circuit connection between contacts 21 and 22, and switch 19 completes circuit between contacts 23 and 24. When switch 20 is depressed, it breaks the circuit between contacts 21 and 22, and establishes the connection between contacts 25 and 26, and when switch 19 is depressed, it breaks the circuit between contacts 23 and 24, and establishes the connection between the contacts 27 and 28.

I also employ two automatic magnets 29 and 30 for the purpose of automatically maintaining the energization of magnets 11 and 12. The small magnets 29 and 30 operate respectively on armatures 31 and 32, and when magnet 29 is energized armature 31 comes in contact with contact 33, and when magnet 30 is energized armature 32 comes in contact with contact 34.

I also show at 35 a diagrammatic illustration of the controller of the car or the brake control, or both of them, in which 36 represents the controller arm or handle, and carries contact strip 37 which establishes a circuit connection between the two contacts 38 and 39 when the controller arm or brake lever 36 is in "off" or "on" position, as the case may be, that is, if the arm 36 is the controller handle the handle would have to be in "off" position, with the car at rest, but if the arm 36 is the brake lever, the lever would have to be in "on" position, with the brakes applied. I will now describe the operation of the system.

Let us suppose that the door and the door engine are at an intermediate position as shown in this drawing and in that case switch 13 makes contact with both contacts

14 and 15. Let us suppose that the open pushbutton 20 is depressed, making contact between contacts 25 and 26. The following circuit then is completed:

From the source of supply 40 to contact 26 to contact 25 to the frame 41 of magnet 29 through said magnet 29, thereby energizing said magnet, to magnet 11, through said magnet 11 to contact 15 to switch 13 and to the return. This energizes both magnet 29 and magnet 11. The moment magnet 29 is energized armature 31 makes contact with contact point 33 whereupon the following circuit is completed:

From source of supply 40 to contact 38 to contact 39, assuming that arm 36 is in its off position, then to contact 23 of pushbutton 19 then to contact 24 and then to contact 33 to armature 31 to frame 41 then through the magnet 29 then through magnet 11 through contact 15 through switch 13 and to the return. The finger therefore, may be instantly withdrawn from pushbutton 20 and magnets 29 and 11 will continue to be energized, and, therefore, magnet 11 will continue to so operate its valve that pressure will be admitted to cylinder 6 and the door engine moved toward open position.

This action of the engine toward open position can be arrested in any one of three different ways, any or all of which operate to break the circuit, that is, deënergize magnets 29 and 11.

If, for example, the controller arm 36 is moved from its off position it will break this circuit and therefore deënergize magnets 29 and 11 and restore them to their normal position and therefore exhaust cylinder 6 leaving the engine dead. Again, if the door has completed its motion so that stop 18 has touched arm 16 of switch 13 it will break contact between switch 13 and contact 15 and thereby break the same circuit and therefore deënergize magnets 29 and 11 so that this will happen at the end of the stroke of the cylinder if the cylinder should not be previously arrested in its motion.

It will be noticed also, it may be mentioned at this point, that if the finger is kept on button 20, thereby energizing magnets 29 and 11 independently of the additional energizing circuit that comes through contacts 23 and 24, that when the engine has completed its motion both energizing circuits are broken as they both return through switch 13, and therefore, if the pushbutton 20 is depressed when the door is wide open or the pushbutton 19 depressed when the door is fully closed it will not energize its respective magnet.

A third way of arresting the motion of the engine is by depressing the opposite button. For example, suppose the door is moving toward open position, this movement having been initiated by momentarily depressing button 20; let us suppose that while this motion of the door engine is in progress button 19 is momentarily depressed. The moment this happens the secondary circuit that is energizing magnets 29 and 11 and which passes through contacts 23, 24 is broken and therefore as in the other cases of other means of arresting the further motion of the door, the supply of air is shut off from cylinder 6 and cylinder 6 is exhausted to the air and the engine becomes dead. In this case, however, a further action is effective. The moment the depressing of button 19 makes contact between 28 and 27, then magnet 12 will be energized as follows:

From the source of supply 40 through contact 27, contact 28, magnet frame 42, magnet 30, thereby energizing the magnet, magnet 12 thereby also energizing this magnet, contact 14, switch 13 and to the return. This will, by energizing magnet 12, turn air into the opposite cylinder 7 and as the deënergizing of magnet 11 has opened cylinder 6 to exhaust, the motion of the engine will be instantly reversed and moved toward closed position, and even although the finger is instantly removed from button 19 the engine will continue toward its closed position as the circuit passing through magnets 30 and 12 will be continued by a similar secondary circuit to that which has already been described as continuing the energization of magnets 29 and 11.

It will be noticed that I do not prefer to bring the secondary circuit of magnet 30 through the contacts on the car control, and my object is as follows: It is conceivable that times may arise when it is desirable or necessary to open a door while a car is in motion, but these times are exceptional and it is desirable, therefore, that if the conductor or motorman or whoever operates the door, should inadvertently do so when the car is in motion that the operation will be somewhat different from what it was under normal conditions and I therefore so arranged matters that in opening the door the finger must be kept continuously on the button if the car controller is not in off position or the door will not continue to open, but if the car controller is in off position a momentary touch on the open button will cause the door to open wide open, or until it is arrested by moving the controller or by touching the closed button.

In closing the door, however, no such safeguard is necessary as it should be possible to close the door under any and all conditions.

It will be noticed, therefore, that the momentary touch on the opening or closing button not only starts the door in the desired direction, but causes the door to continue in that desired direction unless arrested by one or the other means provided for the purpose, and that no auxiliary parts operated by the compressed air, either the action of the piston itself or of its connecting mechanism or the action of an auxiliary cylinder operated by the compressed air, is necessary for this automatic action in holding the energized valve in its energized position. It will be noticed also that a momentary touch on the opposite pushbutton will not only arrest the further motion of the door but will instantly reverse its motion. It will be noticed also that in the event of the switches that automatically hold the electrically controlled valves in energized position being inadvertently closed, for example by the shake or jar of the car while in motion, at a time when they are not desired to be closed that they will have no affect in causing the door to open because the opening circuit that they control to be complete must come through contacts 38 and 39 and the arm 36 of the controller being moved from off position, because we have assumed the car is in motion, there would be no circuit completed and, therefore, even should magnet switch 29 be jarred into closed position it would not cause the door to open, thereby eliminating one of the chief objections hitherto found in the continuous throw-over switch heretofore used for the self-energization of the electrically controlled valves.

The electrically controlled valve is illustrated in Fig. 2 in which 45 is the armature which is pulled downward while the magnet is energized. This downward movement of armature 45 depresses pin 46 and closes valve 47 against its seat and opens valve 51 from its seat. When the magnet is deenergized, spring 52 returns valve 51 to its seat and opens valve 47 from its seat. When, therefore, the magnet is deënergized port 49 which connects to the cylinder that is controlled by the valve, is opened through open valve 47 and port 48 to the atmosphere, and therefore exhausts the cylinder, and the pressure which is connected to port 50 is prevented from entering the cylinder through port 49 by valve 51 being closed by the action of spring 52. When, however, the magnet is energized and valve 47 closed and valve 51 opened then the pressure from port 50 can enter the cylinder through valve 51 and port 49 but cannot pass to the atmosphere as valve 47 is closed.

Where lubricant is inclosed in the casing 90, which incases the gear 4, to prevent such lubricant from splashing upon the switches 14 and 15 and impairing the conductivity or contact thereof, I employ a slightly modified structure as shown in Fig. 3 wherein the switch 13 is pivotally secured to the top of the casing 90 with its arm 16 projecting therein, but with its arms which coöperate with the switches 14 and 15 outside of the casing. The actuation of the switch 13 by the gear 4, and the consequent control of switches 14 and 15 is the same as has already been described in connection with Fig. 1.

Again, it may be advantageous to equip the door that is operated by this engine with an automatic shoe so that if the door strikes an obstruction in closing, this motion will be arrested, or it may be desirable not only to arrest the door so long as the obstruction remains there but to actually reverse the door and open it away from the obstruction.

I have shown on Fig. 5 a door 54 with rollers 55—55 running on track 56. The front of this door 54 is equipped with a shoe 57 which is hung on two parallel short levers 58 and 59 which are pivoted at 60 and 61 to the door 54 so that the shoe by gravity tends to take a forward position and when moved toward the door is caused to rise upwardly at the same time.

Above the door I place a horizontal track or member 62 which is hung on two parallel short levers 63 and 64 which are pivoted respectively at 65 and 66. An extension on the top of shoe 57 rides immediately under the track 62 so that it just clears the same when the shoe 57 is in its normal forwardly position, but the moment the shoe is moved by striking an obstruction it rises against track 62 and raises track 62, thereby swinging the levers 63 and 64 on their pivots 65 and 66.

Lever 64 has a second arm 67 attached thereto and when the shoe is in its normally forward position this lever makes contact between contacts 68 and 69 and while the shoe is moved and therefore raised it causes lever 67 to make contact between contacts 70 and 71. Now it will be remembered that the secondary opening circuit of the door was brought through contacts 38 and 39 on the controller but the secondary closing circuits were not so brought. Now if this secondary closing circuit were brought through contacts 68—69 with which lever 67 normally makes contact, then under normal conditions the secondary closing circuit will always be operative, but if while the door was closing, the shoe should be depressed by the door striking an obstruction then the circuit would be broken at point 68—69 and therefore the magnet would be deënergized and the compressed air from the closing end of the cylinder would be exhausted and the engine would be dead. If, in addition to this, a wire from the main source of supply 40 would be brought to contact 70 and contact 71 should be connected direct to magnet 11, then when the shoe is depressed it will not only deënergize the closing magnet but will energize the opening magnet 11 and cause the door to recede from its obstruction and in this case as the secondary circuit through the small magnet 29 had not been completed the door would not continue its opening movement after the shoe 57 had resumed its normal position and the door would therefore draw back the obstruction just far enough to clear it.

Again, if it is desired that when the door is closing and strikes an obstruction it shall not only be stopped in its further motion and not only withdrawn from the obstruction but should resume its closing motion as soon as it has cleared the obstruction then the following arrangement would be made:

Referring to Fig. 4 arm 67 (which is the same as arm 67 of Fig. 5) makes contact in a slightly different way with its contact points. It makes continuous contact with contact 75 in the particular form shown and contact with either contact 73 or 74 according to whether the shoe is in its forward position or in its elevated position, and in the intermediate position it makes contact with both 73 and 74, that is, it does not break contact with 73 until after it has made contact with 74. Now if, in place of the wiring as described in connection with Fig. 5, the wire that leads from the closing secondary magnet 30 to the closing magnet 12 should be first brought to contact 75 and then contact 73 connected to magnet 12 then the normal operation of the door would be exactly as heretofore described as the circuit from magnet 30 to magnet 12 would be completed whenever the shoe is in its forward normal position. If, however, the shoe is moved then arm 67 would travel from contact 73 to 74 and if contact 74 was connected by another wire to the opening magnet 11 then the secondary circuit that was passing through the magnet 30 would be transferred from the closing magnet 12 to the opening magnet 11. It is necessary in this connection that the arm 67 should make contact with 74 before it loses contact with 73 as otherwise magnet 30 would be deënergized momentarily in the transfer and would drop its armature, thereby breaking the secondary circuit. The moment, therefore, the shoe is moved the closing magnet 12 is deenergized and the opening magnet 11 is energized, thereby exhausting the air from cylinder 7 and putting air in cylinder 6 and starting the door toward open position again, but the moment the shoe resumes its normal position the circuit is again made through magnet 12 and broken through magnet 11 and, therefore, the air is again placed in cylinder 7 and exhausted in cylinder 6 and the door resumes its closing movement automatically and this action will continue until the door is fully closed.

It will be noticed also that when the door is fully closed, that as it has been heretofore mentioned, the closing circuit is broken by the switch 13 and therefore no circuit can be completed through the closing magnet 12, and therefore, even if someone in the car should depress the shoe, they will not thereby complete a circuit through magnet 11 because depressing this shoe only transfers a secondary circuit from one magnet to another but does not itself complete the secondary circuit.

My present application is confined to the motor and its control, and the subject matter of the application of the motor as a door operator is claimed in my co-pending application, Serial No. 161,495, filed April 12th, 1917.

While I have shown and described various structures and arrangements embodying the principles of my invention, I wish it to be understood that my broad invention, as defined in the claims, is not to be limited or restricted to any specific arrangement or to any detail thereof, as it is obvious that many modifications and changes in detail will readily occur to those skilled in the art without departing from the spirit of my invention. Therefore, having now set forth the objects and nature of my invention, and having shown and described an operative structure embodying the principles thereof, what I claim as new and useful and of my own invention, and desire to secure by Letters Patent, is,—

1. The combination with a fluid pressure actuated motor, magnet valves for controlling the supply of pressure to said motor, normally open circuits for said magnet valves, means for closing said circuits, and electrically operated means, actuated by the momentary closing of one of said circuits, for maintaining said circuit closed until the operation of said motor is completed, and means actuated by the momentary closing of the other of said circuits for breaking said first mentioned circuit.

2. The combination with a fluid pressure actuated motor, magnet valves for controlling the supply of pressure to said motor, normally open circuits for said magnet valves, means for closing said circuits, and electrically operated means, actuated by the momentary closing of one of said circuits, for maintaining said circuit closed until the operation of said motor is completed, and means actuated by the momentary closing of the other of said circuits for breaking said first mentioned circuit, and reversing the operation of said motor.

3. The combination with a fluid pressure actuated motor, magnet valves for controlling the supply of pressure to each end of said motor, a normally open circuit for controlling each of said magnet valves, means for momentarily closing one of said circuits to energize one of said magnet valves, and electrically operated means controlled by the momentary completion of said circuit for maintaining said circuit closed, and means to momentarily close the other of said circuits, and electrically operated means actuated thereby for breaking said first mentioned circuit and for maintaining said second mentioned circuit closed.

4. The combination with a fluid pressure actuated motor, magnet valves for controlling the supply of pressure to each end of said motor, a normally open circuit for controlling each of said magnet valves, means for momentarily closing one of said circuits to energize one of said magnet valves, and electrically operated means controlled by the momentary completion of said circuit for maintaining said circuit closed, means for momentarily closing the other of said circuits to energize the other of said magnet valves, and means operated by the momentary closing of said second circuit for de-energizing said first mentioned magnet valve, and maintaining said second circuit closed to reverse the operation of said motor.

5. The combination with a fluid pressure actuated motor comprising pressure cylinders, pistons operating in said cylinders, a rack connecting said pistons, a gear operated by said rack, electrically operated valves controlling the supply of fluid pressure to said cylinders, normally open circuits for controlling said valves, a normally closed switch included in each of said circuits, means for independently closing said circuits and means operated by said gear for opening said switch and the circuit so closed when the pistons complete their working stroke.

6. The combination with a fluid pressure actuated motor, a magnet valve for controlling the supply of fluid pressure to said motor, a normally open circuit for said magnet valve, a manually operated switch for closing said circuit, of means whereby a momentary closing of the manually operated switch will cause the motor to operate in one direction, means for automatically maintaining such movement of said motor in that direction until the movement of said motor in that direction is completed, and means whereby the accidental actuation of said automatic means will not initiate a movement of said motor.

In testimony whereof I have hereunto set my hand in the presence of the subscribing witnesses, on this 21st day of December A. D., 1916.

HAROLD ROWNTREE.

Witnesses:
H. ELLIS,
CHAS. A. GERING,
O. A. BROTEN.